Patented Aug. 15, 1933

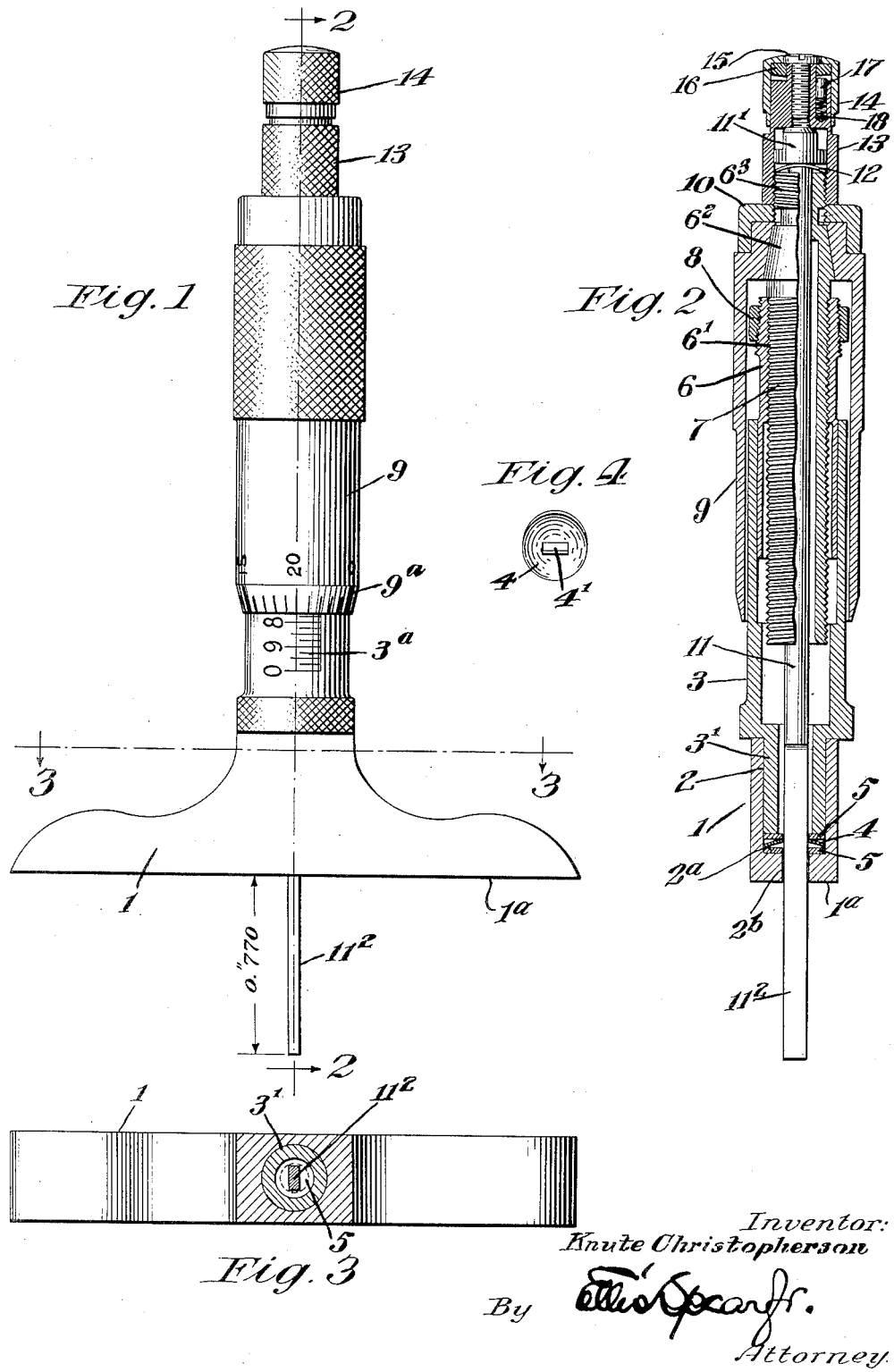

1,922,758

UNITED STATES PATENT OFFICE 1,922,758

MICROMETER DEPTH GAUGE

Knute Christopherson, Minneapolis, Minn., assignor to The L. S. Starrett Company, Athol, Mass., a Corporation of Massachusetts Application October 8, 1928. Serial No. 311,216

10 Claims. (Cl. 33—170)

This invention relates to improvements in micrometer depth gauges, and has generally in view to provide a thoroughly practical micrometer depth gauge which is of relatively simple, compact and inexpensive construction, and which embodies various novel features of combination and arrangement designed greatly to facilitate the taking of accurate measurements.

The present gauge is of generally standard design embodying a base which is adapted to be seated against some part of a structure relative to which a measurement is to be taken, a measuring element in the form of a rod to be adjusted relative to the base, and a micrometer screw carried by the base and operatively connected with the rod for adjusting the same and to indicate the amount of adjustment thereof relative to the base thus to obtain the desired measurement. In standard gauges of this general type as heretofore produced the rod usually has been connected with the micrometer screw for rotation therewith. Consequently, when the end of the rod is brought into contact with an object by the combined longitudinal and rotary motion imparted thereto by the micrometer screw it is difficult, because of the rotary motion, to determine the exact instant that contact of the end of the rod with the object takes place, which, in cases where extremely accurate measurements are required, is quite disadvantageous. Accordingly, a particularly important object of the present invention is to provide, in a micrometer depth gauge of generally standard type, means whereby rotation of the micrometer screw imparts only longitudinal movement to the measuring rod.

Another object of the invention is to provide means to hold the measuring rod against rotation by the micrometer screw, which means is itself held frictionally against rotation, so that the measuring rod, which preferably is of substantially rectangular cross section, may be rotatably adjusted for use in any desired position of such adjustment.

Another object of the invention is to provide a novel swivel connection between the measuring rod and the micrometer screw to permit rotation of the screw without imparting rotation to the rod.

Another object of the invention is to provide a depth gauge embodying the aforementioned novel features and also embodying a construction whereby measuring rods of different lengths may readily be interchanged.

With the foregoing and various other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:

Figure 1 is a side elevation of a micrometer depth gauge constructed in accordance with a practical embodiment of the invention.

Figure 2 is a central longitudinal section through the gauge on the line 2—2 of Figure 1.

Figure 3 is a cross section on the line 3—3 of Figure 1; and

Figure 4 is a perspective view of the friction disk for holding the measuring rod normally against rotation.

Referring to the drawing in detail, it will be observed that the present gauge is of generally standard design and is inclusive, as usual, of a base 1 having a flat end surface 1a to be seated against some appropriate surface of a structure relative to which surface a measurement is to be taken.

Formed in the base 1 perpendicularly to the flat end seating surface 1a thereof and opening through the opposite surface thereof is a relatively large bore 2 which is of less depth than the base whereby a shoulder 2a is formed at the bottom of said bore. In addition, a smaller bore 2b, axially alined with the bore 2, is formed through the base and opens at its outer end through the surface 1a and at its inner end into the bore 2.

A hollow stem 3 has one end 3' thereof formed to fit snugly within the bore 2 of the base 1 and to be secured within said bore by a press fit or in any other suitable manner, while provided on said step is a suitable stop or shoulder for engagement with the base 1 to limit insertion of the stem end portion 3' into the bore 2, the length of the portion 3' being appropriately less than the depth of the bore 2 so that when the portion 3' is fully inserted into the bore the inner end of the portion 3' is spaced from the shoulder 2a.

Prior to insertion of the stem end portion 3' into the bore 2, a pair of flat washers 5, 5 with a dished friction washer 4 disposed therebetween are placed in said bore, and in this connection it is pointed out that the spacing of the inner end of the stem portion 3' from the shoulder 2a is such that when the stem portion 3' is fully inserted into the bore 2 the washers are placed under compression between the stem end and the shoulder 2a, whereby the washer 4 normally is held frictionally against rotation but is capable, however, of being forcibly rotated.

The washers 5, 5, although not essential, preferably are provided to resist any wear resulting from rotation of the washer 4, and said washers 5, 5 are formed with central, preferably circular openings corresponding in diameter to the bore 2b. On the other hand, the dished friction washer 4 is provided with a central opening 4' of rectangular shape for a purpose which will appear later.

The stem 3 is of any suitable length and carries at its end remote from the base 1 a sleeve or nut 6 which is internally threaded, as indicated at 6', to receive a micrometer screw designated as 7. The sleeve or nut 6 is firmly secured to the stem 3 in any suitable manner, as, for example, by reason of its inner end portion having a press fit within the outer end portion of the stem, while in order to take up any play or looseness which might develop between the internal threads 6' of said sleeve or nut 6 and the external threads of the micrometer screw 7, the outer end portion of said sleeve or nut preferably is split and provided with an external tapered and threaded formation on which is engaged an adjustment nut 8. Thus, obviously, adjustment of this nut 8 in one direction or the other is effective either to contract or to permit expansion of the outer end portion of the sleeve or nut 6 to obtain a desired working fit between the threads of the micrometer screw 7 and the threads of said sleeve or nut 6.

The micrometer screw 7 extends beyond the outer end of the sleeve or nut 6 and near its outer end is provided with an outwardly tapered formation $6^2$ which is received within a correspondingly tapered hole in the outer end of a shell 9 which extends inwardly in enclosing relation to the sleeve or nut 6 and the stem 3.

At its outer end the micrometer screw 7 is externally threaded, as at $6^3$, and has engaged thereon a cap nut 10 which engages the outer end of the shell 9 and thereby is effective to draw the tapered formation $6^2$ of the screw 7 tightly into the tapered hole in the shell, thus to rigidly connect said screw and shell together for unitary movement. Consequently, by reason of the threaded connection between the screw 7 and the nut 6, it is apparent that rotation of the shell 9 results in movement of the shell and the screw 7 longitudinally with respect to the stem 3 and the working face 1a of the base 1. In this connection it will be noted that the stem 3 is longitudinally graduated as indicated at 3a and that the shell 9 is circumferentially graduated as indicated at 9a for cooperation with the graduations 3a, whereby the amount of longitudinal movement of the shell 9 and the stem 6 from a zero position and relative to the base 1 for any given adjustment of the shell may readily be determined.

The screw 7 is axially bored to accommodate a measuring rod designated as 11, and as will be observed by particular reference to Figure 2 of the drawing, this measuring rod is provided at its outer end with an enlarged head 11' and has its inner or working end portion flattened or formed into substantially rectangular cross sectional shape, as indicated at $11^2$, for cooperation with the aforementioned friction washer 4. At least a portion of said rod is formed of cylindrical shape to snugly fit at least a portion of the bore in the screw 7, whereby said rod is adapted to be held axially alined with said screw. However, the fit of said rod within said stem is sufficiently loose to permit more or less free relative rotation between the screw and the rod.

The rod 11 is insertable through the outer end of the screw 7 inwardly through the bore thereof and through the stem 3 and the washers 5, 4 and 5 and the bore 2b of the base 11 to dispose the inner end of the rod for cooperation with the working face 1a of the base, and in this connection it is pointed out that the hole 4' in the friction washer 4 snugly accommodates the flattened end portion $11^2$ of said rod whereby the rod is frictionally held against rotation normally, but is permitted to be rotatably adjusted to dispose the flattened end portion thereof in any desired angular position relative to the base 1.

A cap nut 13 is threaded on the outer end portion $6^3$ of the screw 7 against the head 11' of the rod 11 to hold said rod in assembly with said screw, and in this connection it will be observed that a spring washer or equivalent resilient member 12 is interposed between the head of said rod and the end of said screw to hold the rod firmly against any endwise play when the nut 13 is in a fully applied position with its inner end engaging the cap nut 10. In the absence of this washer or resilient member 12 it would be difficult from a manufacturing standpoint to provide for holding the rod 11 against longitudinal movement and at the same time to provide for its more or less free rotation relative to the screw 7, whereas by reason of said washer this manufacturing difficulty is avoided.

Now, in view of the foregoing, it is apparent that a swivel connection is provided between the measuring rod 11 and the micrometer screw 7 whereby rotation of the micrometer screw is effective to longitudinally adjust the rod relative to the base 1 without rotating the rod. Moreover, it is apparent in this connection that while the dished friction washer 4 serves to hold the rod 11 against rotation when the shell 9 and the screw 7 are rotated to longitudinally adjust the rod, nevertheless the rod itself is rotatably adjustable by reason of the fact that the washer 4 merely is held frictionally against rotation. In this connection the rod 11 may be rotatably adjusted simply by grasping its flattened end portion $11^2$ and exerting a turning effort thereon. However, the proper manner of effecting rotary adjustments of the rod 11 is to remove the nut 13 and effect the adjustment through the rod head 11', to which end the said head preferably is provided with flattened sides to facilitate turning thereof.

Rotatably mounted on the nut 13 by means of a screw 15 is a cap 14 having ratchet teeth 16 with which cooperate a pawl 17 which is carried by the nut 13 and which is urged into engagement with the teeth 16 by a spring 18. So long as there is no resistance to longitudinal movement of the rod 11 the frictional engagement of the pawl 17 with the teeth 16 is sufficient to transmit rotary movement of the cap 14 to the shell 9 and to the micrometer screw 7, but when longitudinal and consequently rotative movement of the rod 11 is resisted, as, for example, when the end of said rod strikes a shoulder or the like of a structure being measured, any further rotation of the cap 14 simply results in the teeth 16 passing over the pawl 17 without imparting rotation to the nut 13 and through the latter to the micrometer screw 7. In this way, assuming that the face 1a of the base 1 is held against some surface of a structure and that the end of the rod 11 is advanced by rotation of the cap 14 towards a shoulder or the like of the structure to determine by means of the gauge the distance between the shoulder and the surface against which the base 1 is held, it is manifest that when the end of the rod 11 strikes the shoulder any further rotation of the cap 14 simply results in idle movement of the same without effect to further advance the rod 11, whereby the uncertainties incident to attempting to "feel" the contact of the end of the measuring rod with the part being measured are avoided. Of course, some mechanics may prefer the "feel" method of obtaining measurements in preference to using the cap 14, and in that event rotative adjustments of the micrometer screw may be effected in any manner desired, as, for example, by means of the shell 9 instead of by the cap 14. However, regardless of how the gauge is manipulated to adjust the rod 11 relative to the base 1, it is manifest that since the rod is not rotated with the micrometer screw, it is much easier to obtain an accurate measurement than in any instance where the measuring rod is advanced into contact with a part to be measured by a combined rotary and longitudinal movement.

As indicated in the foregoing description, the gauge is used by seating the face 1a of the base 1 against some face of a structure relative to which a measurement is to be taken, and by then rotating the micrometer screw, either by the cap 14 or in any other desired manner, to advance the end of the measuring rod into contact with a part of the structure to be measured, the amount of projection of the end of the rod beyond the face 1a of the base equaling the distance between the two faces or parts of the structure being measured and being indicated by the graduations 3a, 9a in a manner well known in gauges of this general type. In this connection it is understood, of course, that a plurality of the rods 11 of different lengths may be provided for selective use and that by reason of the provision for rotative adjustments of said rods the flattened ends 11² thereof may be disposed in any angular relation desired relative to the base 1 for most convenient use of the gauge in any particular instance.

I claim:—

1. In a depth gauge, a base, a measuring rod having oppositely flattened sides, a cupped washer in said base having a perforation therein corresponding in shape to the cross section of the rod and through which perforation said rod extends.

2. In a depth gauge, the combination with a base having a rod-opening and a bore, a rod slidable through said rod-opening, and a rod-frictioning device seated in said bore and effective to permit the rod to swivel relative to said base without disturbing the rod setting, of micrometer adjusting means including an adjustment stem seated in said bore for slidably projecting said rod through said rod-opening without imparting rotation to said rod.

3. In a depth gauge, the combination with a base having a rod-opening of generally cylindric shape, and a bore, a rod of non-circular cross-section slidable through said rod-opening, and a rod-frictioning device having an opening therein of a shape corresponding to the cross section of said rod and seated in said bore and effective to permit the rod to swivel relative to said base without disturbing the rod setting, of micrometer adjusting means including an adjustment stem seated in said bore for slidably projecting said rod through said rod-opening without imparting rotation to said rod.

4. A tool of the character described comprising a base, a stem carried by said base, a micrometer screw having a threaded connection with said stem, a measuring rod, a swivel connection between said measuring rod and said micrometer screw whereby rotation of the screw is effective to impart longitudinal adjustment to the rod, and a member non-rotatably engaged with the rod and having frictional engagement with the base to hold the rod normally against rotation and to permit forcible rotative adjustment of the rod.

5. A tool of the character described comprising a base having a bore, a stem fitted at one end in said bore in said base, a micrometer screw having a threaded connection with said stem, a measuring rod extending through said stem and said base, a swivel connection between said rod and said micrometer screw, and a member frictionally held against rotation between the inner end of the bore in said base and the adjacent end of said stem and non-rotatably engaged with said measuring rod.

6. A tool of the character described comprising a base, a stem carried by said base, a micrometer screw having a threaded connection with said stem, a measuring rod extending through said micrometer screw and said base, means to hold the measuring rod against rotation relative to the base, a nut threaded on the outer end of the micrometer screw, a head on said measuring rod disposed between the end of the micrometer screw and said nut whereby a swivel connection is provided between the micrometer screw and the measuring rod, and a spring element interposed between the head of the measuring rod and the end of the micrometer screw.

7. A tool as set forth in claim 6 in which a cap is rotatably mounted on the nut that is threaded on the micrometer screw, and in which a yieldable connection is provided between said cap and said nut whereby rotation of the cap normally is effective to rotate the micrometer screw and whereby the cap is adapted to be rotated relative to the nut when resistance to rotation of the micrometer screw is encountered.

8. A tool as set forth in claim 6 in which a cap is rotatably mounted on the nut that is threaded on the micrometer screw, and in which a yieldable pawl and ratchet connection is provided between said cap and said nut whereby rotation of the cap normally is effective to rotate the micrometer screw and whereby the cap is adapted to be rotated relative to the nut when resistance to rotation of the micrometer screw is encountered.

9. A tool of the character described comprising a base having a bore, a stem fitted at one end within said bore in said base, a micrometer screw having a threaded connection with said stem, a measuring rod having a swivel connection with said micrometer screw and extending through the stem and the base, and a dished washer held under compression and thereby frictionally held against rotation between the end of said stem and the wall defining the inner end of the stem receiving bore in the base, said washer having a non-circular opening, and a portion of the measuring rod being of a cross section corresponding to the shape of the opening in said washer and being slidably engaged through said opening.

10. A tool as set forth in claim 9 in which the swivel connection between the measuring rod and the micrometer screw comprises a head on the measuring rod disposed outwardly of the outer end of the micrometer screw, and a nut threaded on the outer end of the micrometer screw and cooperating with the rod head to hold the rod in assembly with the micrometer screw for rotation relative thereto.

KNUTE CHRISTOPHERSON.